United States Patent
Jin et al.

(10) Patent No.: US 12,107,664 B2
(45) Date of Patent: Oct. 1, 2024

(54) METHOD FOR PILOTING FROM BYPASS IN A NETWORK BASED ON SATELLITE LOAD PLATFORM

(71) Applicants: PEKING UNIVERSITY, Beijing (CN); BEIJING XINXING WEITONG TECHNOLOGY CO., LTD., Beijing (CN)

(72) Inventors: Ye Jin, Beijing (CN); Guocheng Lv, Beijing (CN); Aimin Liu, Beijing (CN); Baoji Wang, Beijing (CN); Tao He, Beijing (CN); Mingke Dong, Beijing (CN)

(73) Assignees: PEKING UNIVERSITY, Beijing (CN); BEIJING XINXING WEITONG TECHNOLOGY CO., LTD., Beijing (CN)

( * ) Notice: Subject to any disclaimer, the term of this patent is extended or adjusted under 35 U.S.C. 154(b) by 360 days.

(21) Appl. No.: 17/630,522

(22) PCT Filed: Jul. 28, 2020

(86) PCT No.: PCT/CN2020/105099
§ 371 (c)(1),
(2) Date: Jan. 27, 2022

(87) PCT Pub. No.: WO2021/018121
PCT Pub. Date: Feb. 4, 2021

(65) Prior Publication Data
US 2022/0247482 A1 Aug. 4, 2022

(30) Foreign Application Priority Data
Jul. 30, 2019 (CN) .......................... 201910697452.2

(51) Int. Cl.
| H04B 7/185 | (2006.01) |
| H04B 7/204 | (2006.01) |
| H04J 3/06 | (2006.01) |

(52) U.S. Cl.
CPC ....... *H04B 7/1851* (2013.01); *H04B 7/18586* (2013.01); *H04B 7/2041* (2013.01); *H04J 3/0635* (2013.01)

(58) Field of Classification Search
CPC .. H04B 7/185; H04B 7/1851; H04B 7/18513; H04B 7/18515; H04B 7/18517;
(Continued)

(56) References Cited

U.S. PATENT DOCUMENTS

| 6,353,412 B1 * | 3/2002 | Soliman | G01S 5/009 342/387 |
| 6,433,739 B1 * | 8/2002 | Soliman | G01S 5/009 342/387 |

(Continued)

FOREIGN PATENT DOCUMENTS

| CN | 101668191 A | 3/2010 |
| CN | 103929232 A | 7/2014 |

(Continued)

*Primary Examiner* — Quochien B Vuong
(74) *Attorney, Agent, or Firm* — Bayramoglu Law Offices LLC

(57) ABSTRACT

A method for piloting from bypass in a network based on a satellite load platform can unify the influence of distance change and Doppler frequency shift of satellite ground stations in the whole network, and realize accurate quasi synchronization between the clock of the whole network and the clock of the satellite. The method includes transmitting a pilot signal from bypass based on a satellite load platform in a satellite communication system, taking a spaceborne high stability timing clock source as a reference, and trans-
(Continued)

--- the proportion range of the power of the pilot signal to the total power of the pilot frequency bands is 0.1‰~1%; when the pilot signal is transmitted, spreading the pilot signal with a spread spectrum code and superimposing the pilot signal on a communication signal in the pilot frequency bands in a low power spectrum signal mode similar with noise

↓ receiving the pilot signal by the receiving end of the satellite stations mitting the pilot signal to all downlink beams to provide the pilot signal for all satellite stations covered by the satellite.

14 Claims, 5 Drawing Sheets

(58) Field of Classification Search
CPC ............ H04B 7/18528; H04B 7/18532; H04B 7/18586; H04B 7/2041; H04J 3/0635; H04J 3/0638; G04R 20/00; G04R 20/02
See application file for complete search history.

(56) References Cited

U.S. PATENT DOCUMENTS

| | | | |
|---|---|---|---|
| 7,933,215 B2 * | 4/2011 | Schiff | ................ H04B 7/18513 370/320 |
| 10,574,437 B1 * | 2/2020 | Ye | ...................... H04B 1/70735 |
| 2002/0163466 A1 | 11/2002 | Jin | |
| 2004/0092228 A1 | 5/2004 | Force et al. | |

FOREIGN PATENT DOCUMENTS

| | | | |
|---|---|---|---|
| CN | 104062895 A | * | 9/2014 |
| CN | 110505001 A | | 11/2019 |

* cited by examiner the proportion range of the power of the pilot signal to the total power of the pilot frequency bands is 0.1‰~1%; when the pilot signal is transmitted, spreading the pilot signal with a spread spectrum code and superimposing the pilot signal on a communication signal in the pilot frequency bands in a low power spectrum signal mode similar with noise

↓ receiving the pilot signal by the receiving end of the satellite stations

FIG. 1

METHOD FOR PILOTING FROM BYPASS IN A NETWORK BASED ON SATELLITE LOAD PLATFORM

CROSS REFERENCE TO THE RELATED APPLICATIONS

This application is the national phase entry of International Application No. PCT/CN2020/105099, filed on Jul. 28, 2020, which is based upon and claims priority to Chinese Patent Application No. CN 201910697452.2, filed on Jul. 30, 2019, the entire contents of which are incorporated herein by reference.

TECHNICAL FIELD

The invention relates to the technical field of satellite communication, in particular to a method for piloting from bypass in a network based on a satellite load platform.

BACKGROUND

Satellite Communication Technology is a kind of communication between two or more earth stations by using artificial earth satellites as relay stations to transmit radio waves. Since the 1990s, the rapid development of satellite mobile communication has promoted the progress of antenna technology. Satellite communication has many advantages, such as wide coverage, large communication capacity, good transmission quality, convenient and rapid networking, easy to realize global seamless link and so on. It is supposed to be an essential means to establish global personal communication.

A satellite communication system consists of a communication satellite and earth stations connected by the satellite. At present, geostationary communication satellite is the most commonly used star in the global satellite communication system. It is to launch the communication satellite to an altitude of 35860 km above the equator, making the operation direction of the satellite consistent with the rotation direction of the earth, and making the operation cycle of the satellite just equal to the rotation cycle of the earth (24 hours), so as to keep the satellite in synchronous operation all the time. Therefore, geostationary satellite is also called synchronous orbit satellite.

The synchronous orbit satellite periodically moves around the earth at a high speed. During the high-speed movement of the satellite, the distance between the satellite and each ground receiving station will constantly change, resulting in the phase difference between the satellite clock and the ground receiving station clock. The Doppler frequency shift will be caused in the case of the high-speed operation of the satellite causing the signal frequency distortion of the signal received by the ground receiving station. This leads to the offset between the ground receiving station clock and the satellite clock, resulting in the clock out-synchronization between the satellite ground stations.

In the case of multiple beams, the distance difference between user stations across different beams is larger, and the Doppler frequency shift of the satellite is more significant than that of user stations in different beams, resulting in large clock deviation between user stations across different beams, which requires an additional reference station for clock synchronization.

The methods using satellite navigation timing to correct the local clock to obtain high-precision clock and realizing time synchronization with time transfer technology have been deeply studied at home and abroad. GPS Disciplined Oscillator (GPSDO) is realized by taking advantage of the good long-term stability of GPS clock or the good short-term stability of chip level atomic clock. In traditional methods, a high-precision external reference clock or high-precision clock source is needed.

SUMMARY

In order to overcome the defects of the prior art, the technical problem to be solved by the invention is to provide a method for piloting from bypass in a network based on a satellite load platform, which can unify the influence of distance change and Doppler frequency shift of satellite ground stations in the whole network, and realize accurate quasi synchronization between the clock of the whole network and the clock of the satellite.

The technical scheme of the invention is as follows.

A method for piloting from bypass in a network based on a satellite load platform includes: transmitting a pilot signal from bypass based on a satellite load platform in a satellite communication system, and taking a spaceborne high stability timing clock source as a reference; and transmitting the pilot signal to all downlink beams to provide the pilot signal for all satellite stations covered by the satellite.

In the invention, a pilot signal from bypass is transmitted based on a satellite load platform and takes a spaceborne high stability timing clock source as a reference. The pilot signal is transmitted to all downlink beams to provide the pilot signal for all satellite stations covered by the satellite. Therefore, it can unify the influence of distance change and Doppler frequency shift of satellite ground stations in the whole network, and realize accurate quasi synchronization between the clock of the whole network and the clock of the satellite.

BRIEF DESCRIPTION OF THE DRAWINGS

FIG. 1 is a flowchart showing a preferred embodiment of a method for piloting from bypass in a network based on a satellite load platform according to the present invention.

DETAILED DESCRIPTION OF THE EMBODIMENTS

Figure 2:
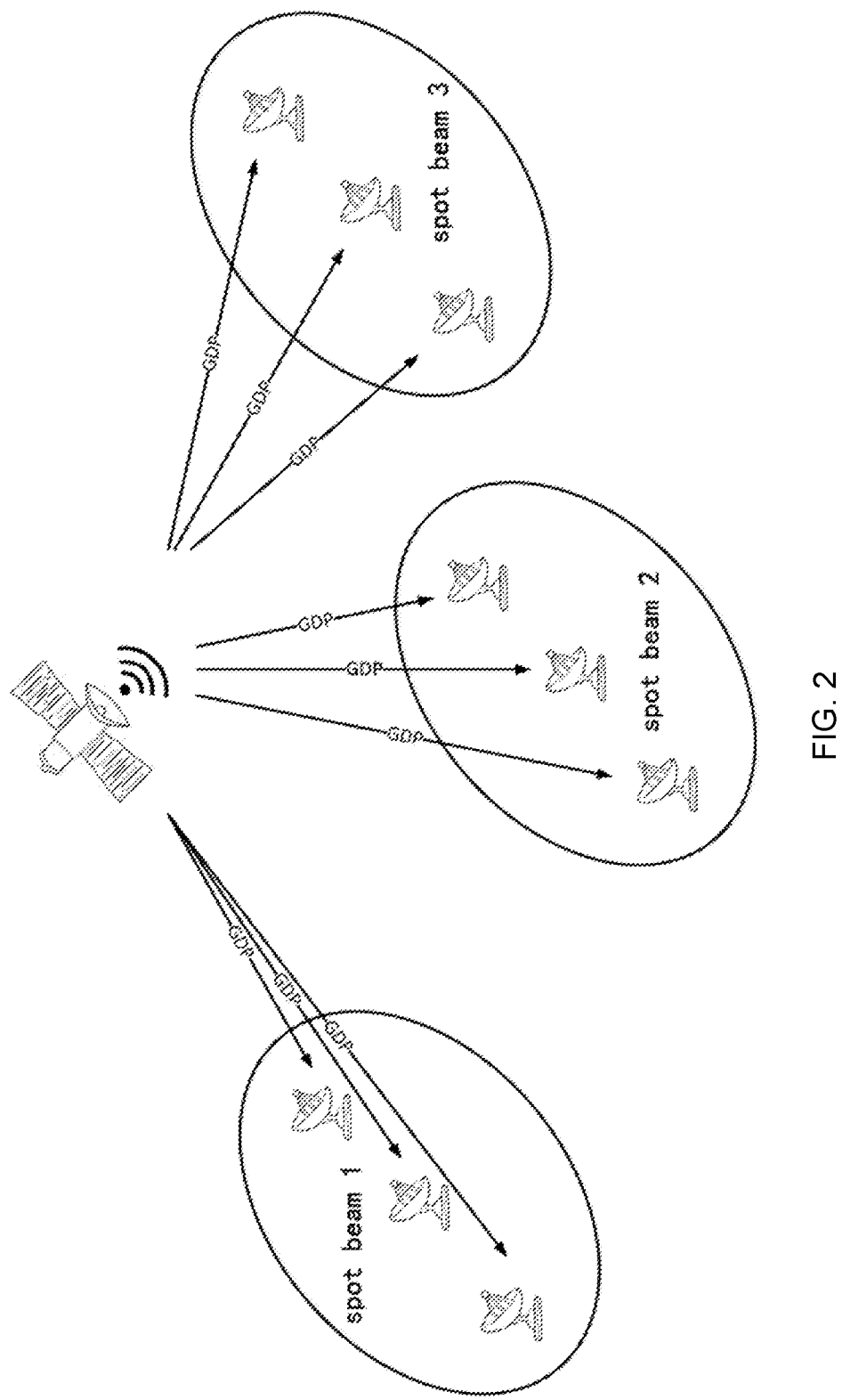
FIG. 2 is a schematic diagram showing transmission of a pilot signal on a satellite according to the present invention, wherein the pilot signal does not include indication information.

This method for piloting from bypass in a network based on a satellite load platform, wherein transmitting a pilot signal from bypass based on a satellite load platform in a satellite communication system, and taking a spaceborne high stability timing clock source as a reference; and transmitting the pilot signal to all downlink beams to provide the pilot signal for all satellite stations covered by the satellite.

In the invention, a pilot signal from bypass is transmitted based on a satellite load platform and takes a spaceborne high stability timing clock source as a reference. The pilot signal is transmitted to all downlink beams to provide the pilot signal for all satellite stations covered by the satellite. Therefore, it can unify the influence of distance change and Doppler frequency shift of satellite ground stations in the whole network, and realize accurate quasi synchronization between the clock of the whole network and the clock of the satellite.

Preferably, as shown in FIG. 1, in each downlink beam, all or some of frequency bands occupying the downlink channel are transmitted. All or some of the frequency bands occupied by the pilot signal in the downlink channel are pilot frequency bands. The proportion range of the power of the pilot signal to the total power of the pilot frequency bands is 0.1‰-1%. When the pilot signal is transmitted, it is spread with a spread spectrum code and superimposed on a communication signal in the pilot frequency bands in a low power spectrum signal mode similar with noise. The influence on the received signal-to-noise ratio of the satellite stations is lower than that on the background thermal noise of the receiving end of the satellite stations.

The pilot signal provides pilot, carrier wave and clock synchronization, standard timing and indication information for network construction and mutual communication of multiple types of terminal stations in channels.

In the invention, a satellite is selected as a reference in open wireless channels. A pilot signal is transmitted and all or some of frequency bands in open wireless channels are occupied by the pilot signal to transmit. All or some of the frequency bands occupied by the pilot signal are pilot frequency bands. The proportion range of the power of the pilot signal to the total power of the pilot frequency bands is 0.1‰-1%. Therefore, the power of the pilot signal is far lower than that of other signals, and redundant measurement data do not need to be inserted into service data. The pilot signal can be received by each earth station in the open wireless network. When the pilot signal is transmitted, it is spread with a spread spectrum code and superimposed on a communication signal in the pilot frequency bands in a low power spectrum signal mode similar with noise. The influence on the received signal-to-noise ratio of the receiving end signal is lower than that on the background thermal noise of the receiving end, which does not affect the reception performance of other signals. In the network, a user receiving station monitors the pilot signal from the satellite and completes clock synchronization between the user receiving station and the satellite clock by receiving the pilot signal. Therefore, it can unify the influence of distance change and Doppler frequency shift of satellite ground stations in the whole network, and realize accurate quasi synchronization between the clock of the whole network and the clock of the satellite.

Preferably, the pilot signal comprises: a frame header, a frame number and an indication information data body; the frame header comprising: a synchronization header and a pilot; the synchronization header is configured for timing of a pilot signal frame and recovery of a carrier wave, and the pilot is configured for eliminating frequency offset of the pilot signal frame; the frame number is identification of cyclic sequence of the pilot signal frame; the indication information data body is configured for carrying indication information for indicating channel, network state and management information.

In the network, the satellite station receives the pilot signal transmitted by the satellite, and completes the clock synchronization between the satellite station and the satellite load platform by receiving the pilot signal.

Figure 3:
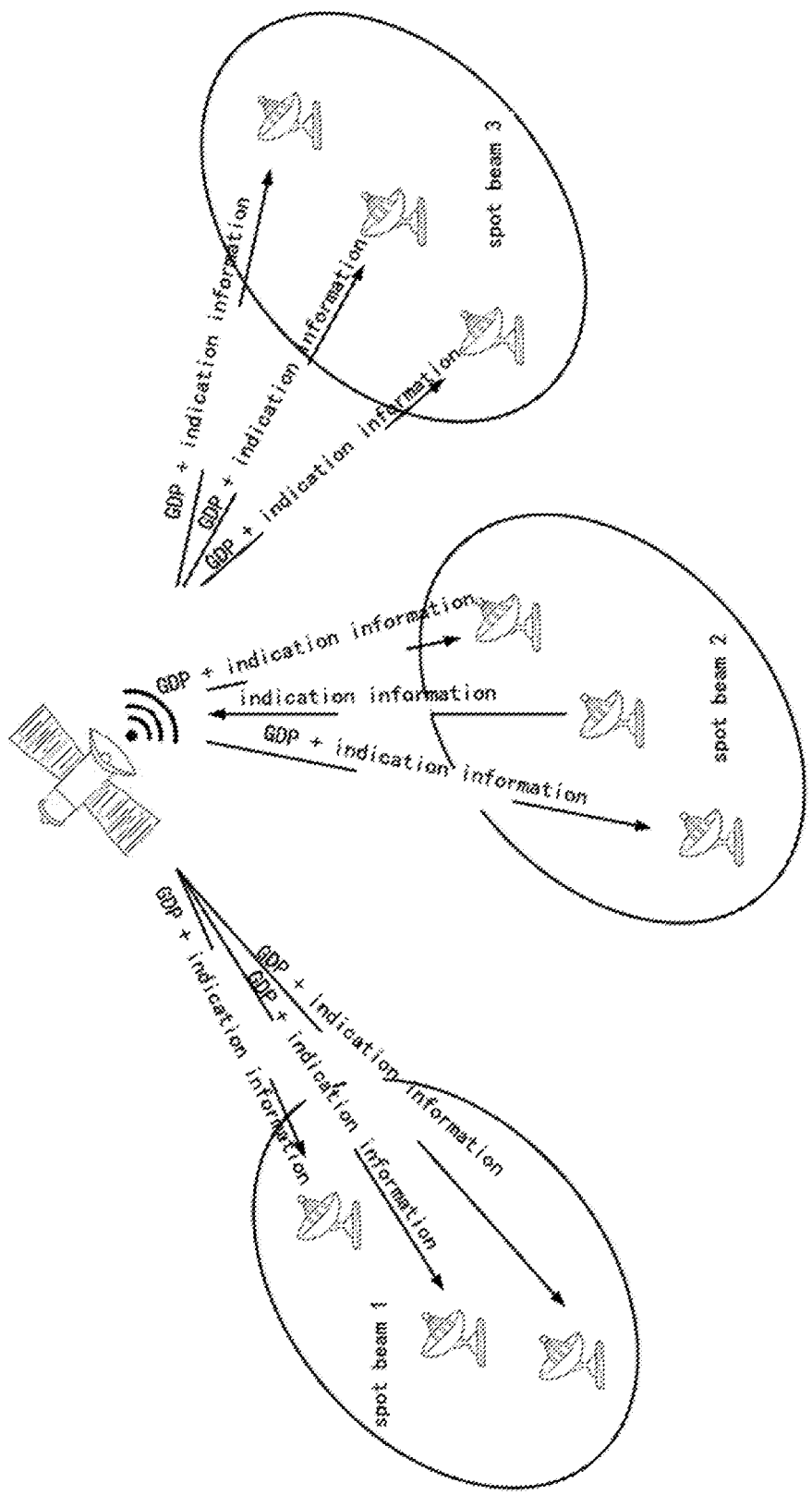
FIG. 3 is a schematic diagram showing transmission of a pilot signal on a satellite according to the present invention, wherein the pilot signal includes indication information, which is generated by a ground network management satellite station.

The pilot signal is generated by the satellite (as shown in FIG. 2), and an indication information data body contains state information and operation information of the satellite, but the satellite platform cannot directly obtain information of the ground network. Earth stations in each uplink spot beam collect the relevant indication information to the satellite platform (as shown in FIG. 3). The relevant indication information is demodulated, received, and sorted by the satellite platform. Then, it is broadcast to all satellite stations in all the downlink spot beams by the indication information data frame in the pilot signal. The ground network information that cannot be directly obtained by the satellite platform includes: satellite ground network state, satellite station network access state, satellite station operation state and resource allocation state.

The pilot signal is generated by the satellite, and the indication information is collected to the satellite platform which becomes the management and pilot information center of the whole satellite system.

Alternatively, indication information is generated by the satellite, and broadcast after combining with the pilot signal.

Figure 4:
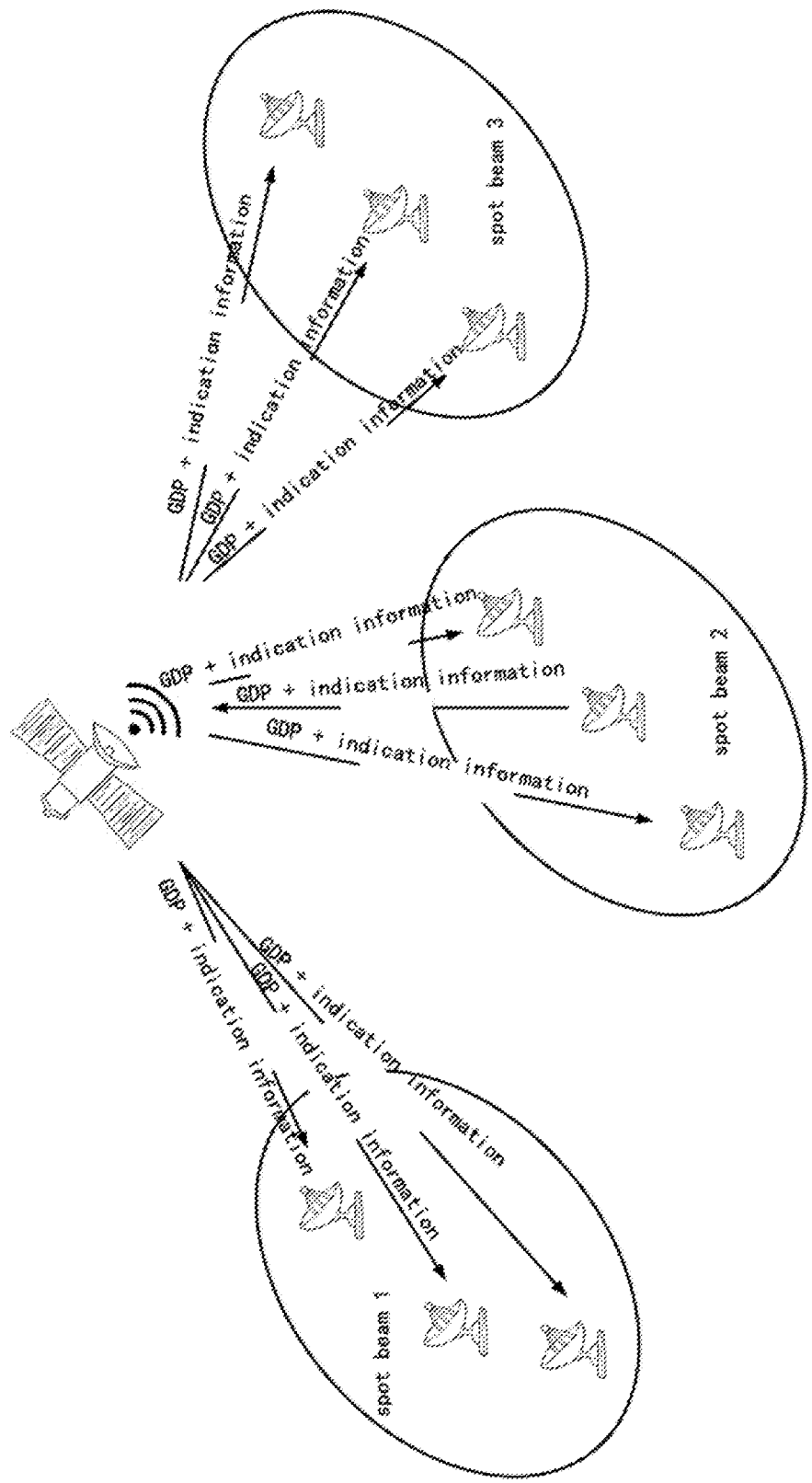
FIG. 4 is a schematic diagram showing transmission of a pilot signal on a satellite according to the present invention, wherein the pilot signal includes indication information. The indication information of the ground system is generated by one or more ground network management satellite stations.

Preferably, as shown in FIG. 4, the pilot signal is transmitted by the management center station in earth stations, and broadcast to a plurality of beams after demodulated and regenerated by the satellite. In this way, the accurate synchronization of the whole network clock across beams can be realized.

Further, as shown in FIG. 4, indication information is transmitted by one of earth stations to the satellite. The satellite receives the instruction information and broadcasts it after combining with the pilot signal.

Alternatively, indication information is generated by the satellite, and broadcast after combining with the pilot signal.

Preferably, the indication information in the pilot signal of the satellite platform includes: pilot frame number, satellite operation information, satellite state information, network operation and network management information of all ground stations under multiple beams, operation information of all satellite stations under multiple beams, satellite channel state information, satellite channel resource allocation information, system service information and system security information. Adding indication information to the data body can make the pilot signal have the ability of network management in addition to realizing accurate clock synchronization. The network management center station can broadcast the pilot signal to the whole network by adding indication information to the data body. After receiving it, the user stations in the whole network can obtain the indication information from the network management center station, so as to achieve the ability of network information synchronization, network resource management and scheduling, and network state perception.

Preferably, the pilot signal comprises: a frame header, a frame number and an indication information data body; the frame header includes a synchronization header and a pilot; the synchronization header is used for timing of a pilot signal frame and recovery of a carrier wave, and the pilot is used to eliminate frequency offset of the pilot signal frame; the frame number is identification of cyclic sequence of the pilot signal frame; the indication information data body is used to carry indication information for indicating channel, network state and management information.

Each terminal station demodulates and receives the pilot signal, extracts the carrier wave and clock information, identifies a reference station transmitting pilot information according to the indication information in the pilot signal, and completes reception of other indication information.

Figure 5:
FIG. 5 is a schematic diagram showing structure of a pilot frame according to a preferred embodiment of the present invention.

As shown in FIG. 5, a pilot signal comprises: a frame header, a pilot, a frame number (ID) and an indication information data body (Data Frame). The frame header is used for timing of a pilot signal frame and recovery of a carrier wave, whose length is in the range of 16-128 bits. The pilot field is all 0 field, and its length is more than 60 bits. It is used to eliminate frequency offset of the pilot signal frame. The length of the frame number field is more than 8 bits, which is used to measure the absolute distance of the earth station. The data body carries network management information and is used to manage and maintain satellite network information with other stations in the network. The length is in the range of 256-1008 bits. For example, in a pilot signal format, the frame header is a 64 bit differential m-sequence (m-sequence is the most basic PN sequence used in CDMA system and the abbreviation of the longest linear feedback shift register sequence), the pilot field is a full "0" sequence with a length of 520 bits, the frame number is an 8 bit sequence number, which is used to represent 0-255, and the data body uses a length of 1008 bits, LDPC coding of 1/2 bit rate for channel coding.

In another pilot signal format, the frame header is a 32 bit differential Gold code, a pilot is a full "0" sequence with a length of 200 bits, a frame number is a 10 bit sequence number, which is used to represent 0-1023, and a data body uses a length of 1008 bits, LDPC coding of 1/4 bit rate for channel coding.

In another pilot signal format, the frame header is a 16 bit differential m-sequence, a pilot is a full "0" sequence with a length of 100 bits, a frame number is a 12 bit sequence number, which is used to represent 0-4095, and a data body uses a length of 512 bits, Turbo coding for channel coding.

Further, by fixing the period of the signal frame and identifying the frame number in the signal frame, the signal frame is used as the basic unit and calibration of the clock. The period of the signal frame is in the range of 1 ms-1000 ms. The pilot signal is circularly modulated by Binary Phase Shift Keying, and continuously or intermittently transmitted. The ground receiving station continuously receives the pilot signal, and can distinguish each frame in the received pilot signal according to the frame structure. As the pilot signal, the length of each frame is fixed, the information rate of each frame is fixed, so the time represented by each frame is also fixed. Therefore, the ground receiving station can determine the time interval by the interval between the pilot signal frames. The interval between signal frames (i.e., signal frame period) is taken as the basic unit of clock, and the time calibration is completed by the time difference between frames with different frame numbers. If the time interval count between the front and rear frame is not equal to the period of pilot signal frames, the clock of the ground receiving station needs to be adjusted.

Further, the period of the signal frame is in the range of 50 ms-250 ms. When the period of the signal frame is an integral multiple of 50 ms, such as 50 ms, 100 ms, 150 ms, 200 ms and 250 ms, it is optimum as the basic unit of clock and calibration.

Preferably, spread spectrum communication is performed by using a spread spectrum code with a length of 64-65536 bits. The spread spectrum code adopts M-sequence, Gold code, OVSF code or C/A code. The best use range of spread spectrum code is 1024-4096. In this range, the effect of spectrum expansion in spread spectrum communication is optimum. The spread spectrum code here is for the data body.

Further, the spread spectrum code adopts M-sequence and Gold code (Gold code is a pseudo-random code derived from M-sequence, which has pseudo-random properties similar to M-sequence, but its length is different, and the number of sequences of it is more than that of M-sequence), OVSF code (Orthogonal Variable Spreading Factor. OVSF code is mainly used for orthogonal spread spectrum. The length of OVSF code used varies with the rate of service channel) or C/A code (Coarse Acquisition Code. A pseudo-random code sent by GPS satellite for coarse ranging and acquisition of GPS satellite, in fact, it is a Gold code, that is, a Gold code composed of two 10 level feedback shift registers).

Preferably, the method includes generating an M-sequence, and then differential coding the M-sequence to eliminate the influence of frequency offset. The sequence after differential coding is used as the frame header. The spread spectrum code uses the M-sequence with the length of 12-128 bit as the basic time sequence. The spread spectrum method here is for the frame header of the pilot signal.

Further, the spread spectrum code uses an M-sequence with a length of 12-128 bit as the basic time sequence. The 64 bit differential M-sequence is used as the frame head of the pilot signal, and the fast synchronous acquisition performance is optimum.

Further, the indication information is encoded by channel coding, which adopts LDPC (Low-density Parity-check) code, Polar code, RS code (Reed-Solomon codes), convolutional code or Turbo code (also known as parallel concatenated convolutional code). The data body is encoded by channel coding and then transmitted, which can significantly improve the received signal-to-noise ratio of the data body at the receiving end of the pilot signal, improve the receiving performance, enable the data body to receive normally in non-optimal working state, and improve the robustness of the whole system.

Preferably, the change of the absolute distance between the satellite and the earth station is obtained by the phase difference between the transmitting end and the receiving end.

In the process that a management center station continuously transmits a pilot signal, a synchronous satellite will keep moving around the earth, showing an "8" track relative to a point under the satellite. Therefore, the distance between the satellite and the management center station will change continuously, resulting in continuous change of a path delay of the pilot signal. However, the movement of the satellite shows a certain regularity, which changes from far to near and then from near to far. Therefore, the change of the path delay also shows a certain regularity.

For the management center station, by self-receiving a pilot signal, the change of a link path delay transmitted to the satellite is consistent with that of a link path delay received from the satellite signal. Therefore, the phase delay between a receiving end and transmitting end of the pilot signal is equivalent to double the change of a satellite to ground path delay. Therefore, when a receiver of spread spectrum communication detects that the maximum correlation peak is moving in a certain direction, a phase delay can be obtained while tracking the maximum correlation peak. Half of the phase delay is the path delay. The change of absolute distances between the satellite and the reference station can be obtained by multiplying the path delay by the speed of light.

Preferably, a ground receiving station calibrates and calculates time by continuously receiving the pilot signal and its cycle of a fixed length, and calculates time by using the number of received frames, so as to achieve the accurate real-time synchronization of the clock between the ground receiving station and the management center station, thus to realize the accurate real-time synchronization of the clock of the whole network.

Preferably, for a system with low real-time accuracy, the pilot signal is transmitted in an interval. The ground receiving station receives the pilot signal in the interval, and absolute time information is added to the pilot signal, so as to achieve clock timing synchronization between the ground receiving station and the management center station, thus to realize the quasi synchronization of the clock of the whole network.

The above contents are only the preferable embodiments of the present invention, and do not limit the present invention in any manner. Any improvements, amendments and alternative changes made to the above embodiments according to the technical spirit of the present invention shall fall within the claimed scope of the present invention.

What is claimed is:

1. A method for piloting from bypass in a network based on a satellite load platform, comprising:
   1) transmitting a pilot signal from the bypass based on the satellite load platform in a satellite communication system,
   2) taking a spaceborne high stability timing clock source as a reference, and
   3) transmitting the pilot signal to all downlink beams to provide the pilot signal for all satellite stations covered by a satellite,
   wherein step 3 comprises:
      transmitting the pilot signal by occupying all or some of pilot frequency bands of downlink channels in each downlink beam,
      wherein the all or some of the pilot frequency bands occupied by the pilot signal in the downlink channels are pilot frequency bands, and
      a proportion range of a power of the pilot signal to a total power of the pilot frequency bands is 0.1‰-1%;
      when the pilot signal is transmitted, spreading the pilot signal with a spread spectrum code and superimposing the pilot signal on a communication signal in the pilot frequency bands in a low power spectrum signal mode similar with noise,
      wherein an influence on a received signal-to-noise ratio of the satellite stations is lower than an influence on background thermal noise of a receiving end of the satellite stations;
      providing a pilot, a carrier wave, a clock synchronization, standard timing, and indication information by the pilot signal for network construction and mutual communication of multiple types of terminal stations in the downlink channels.

2. The method according to claim 1, wherein the pilot signal is generated by the satellite, and the indication information is collected to the satellite load platform, wherein the satellite load platform is a management and pilot information center of the satellite communication system.

3. The method according to claim 2, wherein the indication information in the pilot signal of the satellite load platform comprises: satellite operation information, satellite state information, network operation and network management information of all ground stations under multiple beams, operation information of all the satellite stations under multiple beams, satellite channel state information, satellite channel resource allocation information, system service information, and system security information.

4. The method according to claim 1, wherein the pilot signal comprises: a frame header, a frame number, and an indication information data body, wherein
   the frame header comprises a synchronization header and the pilot; the synchronization header is configured for timing of a pilot signal frame and recovery of the carrier wave, and the pilot is configured for eliminating a frequency offset of the pilot signal frame;
   the frame number is identification of cyclic sequence of the pilot signal frame;
   the indication information data body is configured for carrying the indication information for indicating channel, network state, and management information;
   in the network, each of the satellite stations receives the pilot signal transmitted by the satellite, and completes the clock synchronization between the each of the satellite stations and the satellite load platform by receiving the pilot signal.

5. The method according to claim 1, wherein the indication information in the pilot signal of the satellite load platform comprises: satellite operation information, satellite state information, network operation and network management information of all ground stations under multiple beams, operation information of all the satellite stations under multiple beams, satellite channel state information, satellite channel resource allocation information, system service information, and system security information.

6. A method for piloting from bypass in a network based on a satellite load platform, comprising:
   1) transmitting a pilot signal from the bypass based on the satellite load platform in a satellite communication system,
   2) taking a spaceborne high stability timing clock source as a reference, and
   3) transmitting the pilot signal to all downlink beams to provide the pilot signal for all satellite stations covered by a satellite,
   wherein the pilot signal comprises: a frame header, a frame number, and an indication information data body, wherein
   the frame header comprises a synchronization header and a pilot; the synchronization header is configured for timing of a pilot signal frame and recovery of a carrier wave, and the pilot is configured for eliminating a frequency offset of the pilot signal frame;
   the frame number is identification of cyclic sequence of the pilot signal frame;
   the indication information data body is configured for carrying indication information for indicating channel, network state, and management information;
   in the network, each of the satellite stations receives the pilot signal transmitted by the satellite, and completes a clock synchronization between the each of the satellite stations and the satellite load platform by receiving the pilot signal.

7. The method according to claim 6, wherein
   the pilot signal is generated by the satellite, and
   the indication information data body comprises state information and operation information of the satellite, wherein information of a ground network is obtained by the satellite load platform indirectly; and step 3 further comprises:
  collecting the indication information to the satellite load platform by a network management satellite station in each of uplink spot beams; and
  after the indication information is demodulated, received, and sorted by the satellite load platform, broadcasting the indication information to all the satellite stations in all downlink spot beams by data frames of the indication information in the pilot signal.

8. The method according to claim 7, wherein the information of the ground network comprises: a satellite ground network state, a satellite station network access state, a satellite station operation state, and a resource allocation state.

9. The method according to claim 8, wherein the indication information in the pilot signal of the satellite load platform comprises: satellite operation information, satellite state information, network operation and network management information of all ground stations under multiple beams, operation information of all the satellite stations under multiple beams, satellite channel state information, satellite channel resource allocation information, system service information, and system security information.

10. The method according to claim 7, wherein the indication information in the pilot signal of the satellite load platform comprises: satellite operation information, satellite state information, network operation and network management information of all ground stations under multiple beams, operation information of all the satellite stations under multiple beams, satellite channel state information, satellite channel resource allocation information, system service information, and system security information.

11. The method according to claim 6, wherein the indication information in the pilot signal of the satellite load platform comprises: satellite operation information, satellite state information, network operation and network management information of all ground stations under multiple beams, operation information of all the satellite stations under multiple beams, satellite channel state information, satellite channel resource allocation information, system service information, and system security information.

12. The method according to claim 11, further comprising:
  fixing a period of a signal frame and identifying the frame number in the signal frame as a basic unit and calibration of a clock, wherein the period of the signal frame is in a range of 1 ms-1000 ms;
  modulating the pilot signal circularly by a mode of Binary Phase Shift Keying, and
  transmitting the pilot signal continuously or intermittently.

13. The method according to claim 12, further comprising: performing spread spectrum communication by using a spread spectrum code with a length of 64-65536 bits, wherein the spread spectrum code adopts M-sequence, Gold code, OVSF code, or C/A code.

14. The method according to claim 13, wherein the spread spectrum communication comprises: generating the M-sequence, and then differential coding the M-sequence to eliminate an influence of the frequency offset, wherein
  the sequence after the differential coding is used as the frame header; and
  the spread spectrum code is configured for the M-sequence with a length of 12-128 bit as a basic time sequence.

* * * * *